Patented June 11, 1935

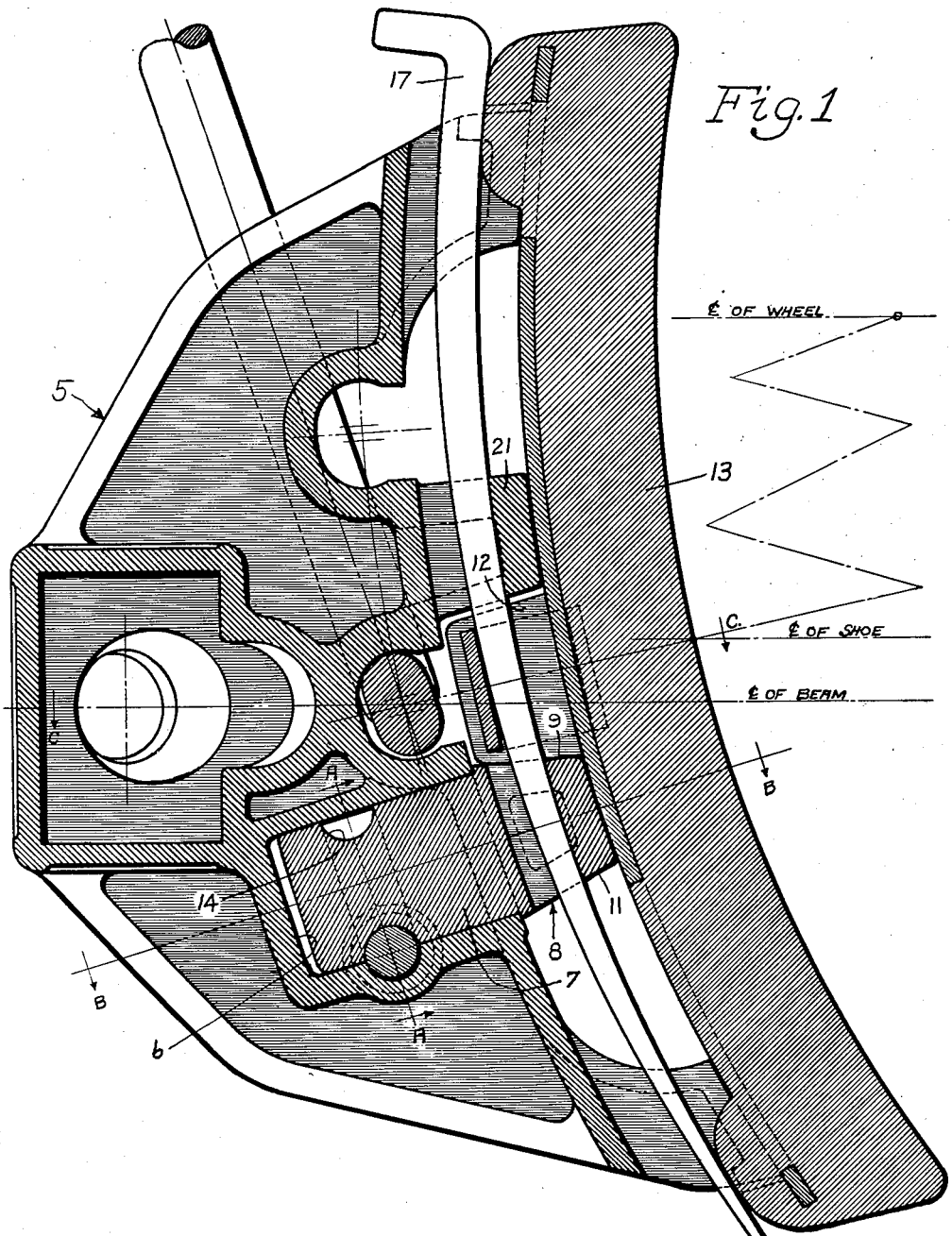

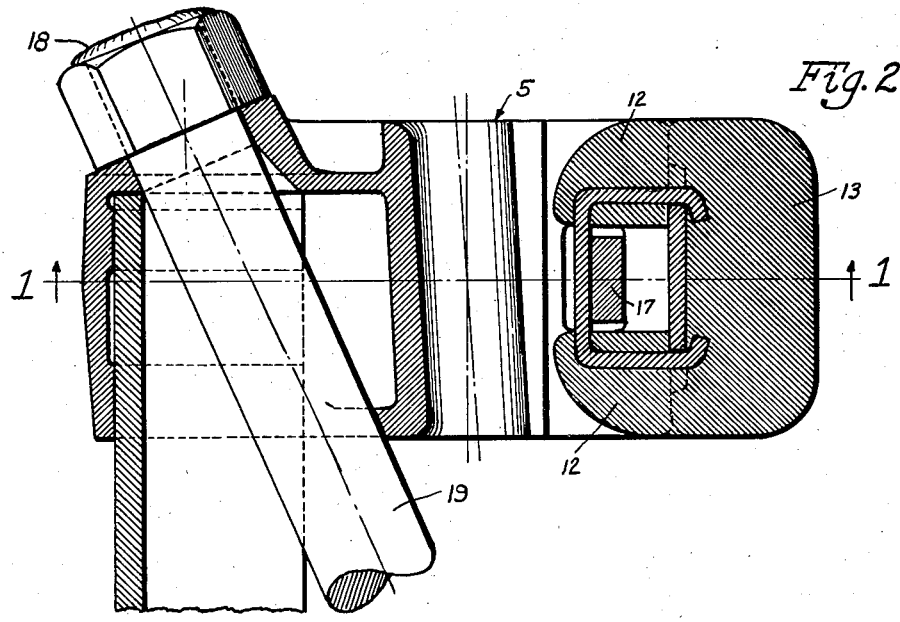
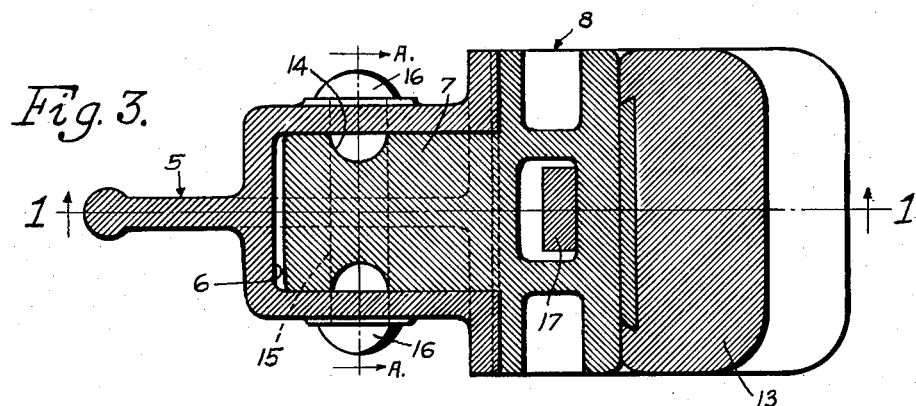
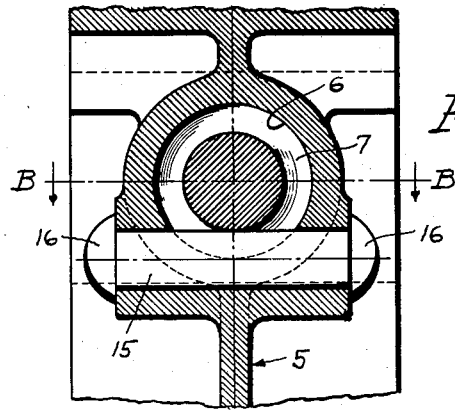

2,004,743

UNITED STATES PATENT OFFICE 2,004,743

BRAKE HEAD

Harley E. Anderson, Chicago, Ill., assignor of one-half to John H. Sharp, Chicago, Ill.

Application January 2, 1935, Serial No. 45

13 Claims. (Cl. 188—236)

This invention relates to brake heads, and particularly to brake shoe supporting lugs therefor.

It is well known among persons associated and familiar with the operation of railways and maintenance of equipment therefor, that considerable time and expense is involved in the repair and maintenance of brake gear, and particularly of the brake heads thereof, due to the wearing away of the shoe supporting lugs of the head, which frequently occurs when other portions of the head are still in serviceable condition.

As provided in the Code of Rules of the American Railway Association, Rule 63, Sec. 5 (c), "The brake beams should be considered as requiring renewal when * * * the distance between upper and lower brake shoe (supporting) lugs measures 2¼ inches or more at face of head.", and owing to other provisions of the code embodying safety measures, such, for example, as the spreading or riveting of the ends of the tension members or rods over the nuts positioned thereon outside the brake heads, such renewals cannot readily be made until the entire brake beam is removed from the car, and at the expense of considerable time and labor.

These code requirements practically prohibit the repair and/or replacement of brake heads while a car is in service, and in order to replace the brake heads when the lugs are worn to or beyond the limits prescribed by the code, it is necessary to send a car to the shop, drop the brake beam, remove the riveted ends of the tension rods and replace the brake head, which means that a car must be taken out of service and sent to the repair tracks, all of which involves considerable expense in time, material and labor, and in loss of car service while repairs are being made.

One object, therefore, of the present invention is to provide a novel structure which will materially lengthen the life of brake heads, and which will materially lessen the necessity of brake head repairs and replacements.

Another object of the invention is to provide a structure wherein the wearing away of brake head lugs by the movement of brake shoe lugs thereon may be compensated for at a minimum expense of time, labor, material and loss of car service.

Another object of the invention is to provide a novel construction and arrangement whereby dangerously worn brake equipment may be put in safe condition, and suitable repairs made without taking a car out of service.

Another object of the invention is to provide a structure which will reduce the necessity of shop repairs on brake heads by at least one-half.

Another object of the invention is to provide a construction and arrangement whereby the wear receiving surfaces of a brake head structure may be hardened, thereby further improving, and materially lengthening the life of brake heads and associated brake shoe supporting parts.

A further object of the invention is to provide a structure whereby badly worn brake equipment may be put in safe condition even while a car is in transit.

A still further object of the invention is to improve devices of the character described in sundry details hereinafter referred to and particularly pointed out in the appended claims.

One embodiment of the present invention is shown for illustrative purposes in the accompanying drawings, in which:

Fig. 1 is a vertical sectional elevational view through a brake head and shoe therefor, taken substantially as indicated by the lines 1—1 of Figs. 2 and 3, and illustrating the application of the present invention thereto;

Fig. 2 is a transverse sectional plan view taken substantially as indicated by the line C—C of Fig. 1;

Fig. 3 is a transverse sectional plan view taken substantially as indicated by the lines B—B of Figs. 1 and 4, and illustrating, more in detail, the preferred embodiment of my improved brake head and shoe supporting lug construction; and Fig. 4 is a vertical sectional elevational view taken substantially as indicated by the lines A—A of Figs. 1 and 3.

In the illustrative embodiment of the present invention as shown in the drawings, a brake head, indicated as a whole by the numeral 5, and of the type ordinarily used in railway equipment, is provided with a socket or recess 6, shown, in the present instance, as of substantially annular form, and adapted to receive a projection or trunnion 7, preferably of cylindrical form, in a manner to rotate therein, the projection 7, in the present instance, being shown as formed integrally with a supporting lug, indicated as a whole by the numeral 8, and having a plurality of wear surfaces 9 and 11 formed thereon and adapted to be positioned with reference to a brake shoe lug 12 formed on a brake shoe 13 in a manner to support the shoe on the brake head 5.

For securing the trunnion 7 and supporting lug 8 against accidental displacement with respect to the brake head 5, the trunnion 7, in the present instance, is provided with an annular groove 14, and mounted in the head 5 and extending, preferably, tangentially to the groove 14 is a pin 15, a portion of which is adapted to extend into the groove 14 in a manner to prevent longitudinal movement of the trunnion 7, and at the same time to permit rotation thereof within the socket or recess 6 formed in the brake head 5, the ends of the pin, being, preferably, headed as indicated at 16 to secure the pin against displacement with respect to the head 5.

As is well known by persons familiar with the operation of railways and the maintenance of equipment therefor, the weight and vibration of brake shoes produces considerable and rapid wear, particularly on the brake head lugs provided for supporting the shoes, and it will be observed from the foregoing description of the lug 8 and its associated parts, that when one brake shoe supporting wear surface, such, for example, as that indicated at 9, has become worn to the danger point, or to the extent specified by the American Railway Association Code of Rules, the brake shoe key 17 for securing a shoe 13 to the head 5, may be removed, and upon removal of the brake shoe from the head, the lug 8 may be turned, in the present instance, through an arc of approximately 180° in a manner to position the brake shoe supporting wear surface 11 of the lug 8 in brake shoe lug engaging or supporting position, thereby replacing the worn surface 9 with an unworn surface and permitting the continued operation of the equipment until the surface 11 has become worn in like manner.

It will be observed that by such an arrangement, the life of the brake shoe supporting lug is at least doubled, and that such replacement of worn surfaces may be made even while a car equipped with the present invention is in transit.

It will be observed also that when all the brake shoe supporting wear-resisting surfaces of the lug 8 have been utilized, the headed portion 16 of the pin 15 may be removed and the pin withdrawn from the head 5, after which the worn lug and associated trunnion may be removed and replaced with a new lug having unworn brake shoe supporting wear surfaces, and a new pin inserted and headed to secure the new lug against displacement with respect to the head.

By reason of such an arrangement, the same head may be continuously used in service until such time as wear on other portions thereof necessitate its removal, whereas in brake head construction, at present in use, the wearing away of the supporting lug, which at present is formed integrally with the brake head, necessitates the entire removal and discarding of the brake beam upon which the worn brake head is mounted, which means the sending of a car to the repair track to remove the condemned brake beam and replace same with new beams and heads, while the old beam with the worn head is sent to the shop to be repaired, which requires the removal of the riveted or headed end portion, indicated at 18, of the tension member or rod 19 in order to remove or replace the worn heads, all of which involves considerable expense in material, time and labor, as well as the loss of car service while such repairs are being made.

It will be apparent also that by reason of the removability of the supporting lug 8, the wear resisting surfaces thereof, such as indicated at 9 and 11, may be suitably hardened, if desired, thereby further improving and materially lengthening the life of the supporting lugs and the brake heads associated therewith.

While the present invention has been shown as applied to the lower supporting lug of the brake head, it will be obvious that a like structure may be substituted for the upper lug 21 if found desirable, and while the lug 8 is shown and described as provided with two brake shoe supporting and wear resisting surfaces indicated at 9 and 11, it will be obvious that under varying conditions, additional surfaces may be provided if found desirable.

It will be apparent from the foregoing description that the present invention provides a novel construction and arrangement whereby the life of brake heads and supporting lugs is materially lengthened, and whereby the necessity of brake head repairs is materially lessened. Furthermore, the present invention provides a construction and arrangement whereby replacement of supporting lugs may be made without discarding the brake head, and wherein dangerously worn surfaces of the supporting lugs may be replaced without taking a car out of service.

Obviously, the present invention is not limited to the precise construction and arrangement shown and described as the same may be variously modified. Moreover, all the features and advantageous aspects of the present invention need not be used conjointly, as the same may be used to advantage in variously different combinations and sub-combinations.

What I claim as new and desire to secure by Letters Patent is:

1. An article of the class described comprising a brake head, and a brake-shoe supporting lug having a plurality of brake shoe supporting surfaces, said lug being movably mounted on said head for positioning said surfaces in brake shoe supporting position.

2. An article of the class described comprising a brake head, and a brake-shoe supporting lug having a plurality of brake shoe supporting wear surfaces, said lug being movably mounted on said head for interchangeably positioning the respective wear surfaces in brake shoe supporting position.

3. An article of the class described comprising a brake head, a brake shoe supporting lug having a plurality of brake shoe supporting wear surfaces, said lug being removably mounted in said head for interchangeably positioning the respective wear surfaces in brake shoe supporting position.

4. An article of the class described comprising a brake head, and a brake shoe supporting lug having a plurality of brake shoe supporting wear surfaces, said lug being rotatably mounted on said head for interchangeably positioning the respective wear surfaces in brake shoe supporting position.

5. An article of the class described comprising a brake head, and a brake shoe supporting lug having a plurality of brake shoe lug engaging surfaces thereon, said supporting lug being rotatably mounted on said head for selectively positioning the respective surfaces in brake shoe lug engaging position.

6. An article of the class described comprising a brake head, and a pair of lugs on the face and adjacent the central portion of said head, one of said lugs having a plurality of supporting wear surfaces and being rotatably mounted on the head for positioning one or another of said surfaces adjacent the other of said lugs.

7. An article of the class described, comprising a brake head, a pair of spaced lugs on the face and adjacent the central portion of said head, one of said lugs having a pair of supporting wear surfaces and being rotatably mounted on the head for positioning one or the other of said surfaces adjacent the other of said lugs, and means for securing said rotatable lug against displacement with respect to said head.

8. An article of the class described, comprising a brake head, a pair of vertically spaced lugs on the face and adjacent the central portion of said head, the lower of said lugs having a pair of supporting wear surfaces and being rotatably mounted on the head for positioning one or the other of said surfaces adjacent the upper lug, and means for securing said lower lug against displacement with respect to said head.

9. A brake head having a recess formed therein, a supporting lug having a plurality of wear surfaces and a projection movably mounted in said recess, and means operatively related to said projection and head for securing the projection and lug against removal from said head.

10. A brake head having a recess formed therein, a supporting lug having a plurality of wear surfaces and a trunnion rotatably mounted in said recess, and a pin engageable with said trunnion and head for securing the trunnion against removal from said head.

11. A brake head having a recess formed therein, a supporting lug having a plurality of wear surfaces and an annularly grooved trunnion rotatably mounted in said recess, and a pin operatively related to the groove in said trunnion and to said head for securing the trunnion and lug against removal from said head.

12. A brake head having an annular recess formed therein, a supporting lug having a plurality of wear surfaces and an annularly grooved trunnion rotatably mounted in said recess, and a pin mounted in said head and positioned in the groove formed in said trunnion for securing the trunnion in said recess and permitting rotation of the trunnion and lug with respect to said head.

13. A brake head having an annular recess formed therein, a supporting lug having a pair of wear surfaces and an annularly grooved trunnion rotatably mounted in said recess, and a pin mounted in said head and positioned in and extending tangentially of the groove formed in said trunnion for securing the trunnion in said recess and permitting rotation of the trunnion and lug with respect to said head for positioning one or the other of said wear surfaces in operative position.

HARLEY E. ANDERSON.